United States Patent
Adair

[15] 3,675,549
[45] July 11, 1972

[54] VERTICAL REFERENCE PENDULUM

[72] Inventor: Robert S. Adair, Austin, Tex.

[73] Assignee: The United States of America as represented by the Secretary of the Navy

[22] Filed: Feb. 4, 1971

[21] Appl. No.: 112,538

[52] U.S. Cl. ............................................................95/1.1
[51] Int. Cl. ......................................................G03b 17/24
[58] Field of Search ..........................95/1.1, 12.5; 33/205.5; 240/1 EL

[56] References Cited

UNITED STATES PATENTS

| 2,098,476 | 11/1937 | Webster | 33/205.5 |
| 2,867,916 | 1/1959 | Birdseye | 240/1 EL |
| 2,047,070 | 7/1936 | Horner | 95/12.5 |

*Primary Examiner*—John M. Horan
*Attorney*—Richard J. Miller and R. S. Sciascia

[57] ABSTRACT

The invention disclosed herein provides a pendulum mounted in a housing with an optical read-out system to operate in conjunction with a photographic device for recording the pitch and roll of a submerged camera.

9 Claims, 4 Drawing Figures

PATENTED JUL 11 1972 3,675,549

INVENTOR
ROBERT S. ADAIR

BY
*Richard J. Miller*
ATTORNEY

VERTICAL REFERENCE PENDULUM

Typical of vertical reference devices commercially available are potentiometer pendulum transducers, electromagnetic pendulous vertical sensors, and electrolytic vertical sensors. The potentiometer pendulum transducers were not suitable for use in the camera because the pendulums did not have repeatability under static conditions. Since the range limits of the electromagnetic pendulous vertical sensors are determined by the linear range of their electromagnetic output, the sensors could cover only a small angular range accurately and therefore were not suitable for use in the vertical reference device needing ±45° range. The electrolytic vertical sensors had the range and resolution required, but the cost was high. Also, all of these commercial sensors provided electrical rather than optical output, and would have required additional circuitry and components before they could be used in the camera.

It is therefore an object of this invention to provide a specially constructed pendulum to minimize forces exerted on its pivots. The pendulums are to provide vertical reference for measuring the orientation of photographic devices under water.

It is yet a further object of this invention to provide an improved vertical reference pendulum device wherein there is provided a cylindrical pivot mounted on its longitudinal axis and suspended in a medium wherein the specific gravity is substantially the same as the net specific gravity of the pendulum and further to provide an optical system for projecting the reading of the pendulum upon a photographic film.

It is still a further object of this invention to provide an improved vertical reference pendulum device, comprising: a housing, a cover for sealing the housing and defining therewith a cavity, a pendulum in the cavity having mounted therein a weight and a void, a liquid filling the cavity having a specific gravity substantially equal to the net specific gravity of the pendulum, means mounted on the pendulum for indicating the rotational position of the pendulum, and means for projecting the light beam through the housing and the pendulum and means for receiving the light beam and projecting it onto a film indicating the position of the pendulum.

It is another object of this invention to provide an improved vertical device wherein there is a reticle mounted upon a pendulum pivotally mounted in a cavity in a housing and suspended in a liquid having a specific gravity substantially that of the pendulum and means for reading the reticle and projecting the reading upon the photographic film for orientating a picture with relationship to pitch and roll.

Other object, advantages and novel features of the invention will become apparent from the following detailed description of the invention when considered in conjunction with the accompanying drawings wherein.

Figure 1:
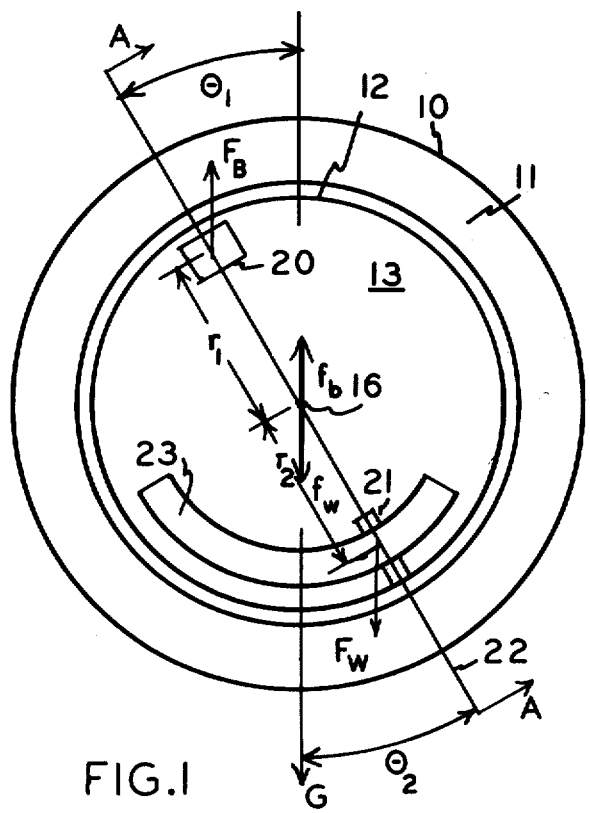
FIG. 1 is a front view of the vertical reference device.
Figure 2:
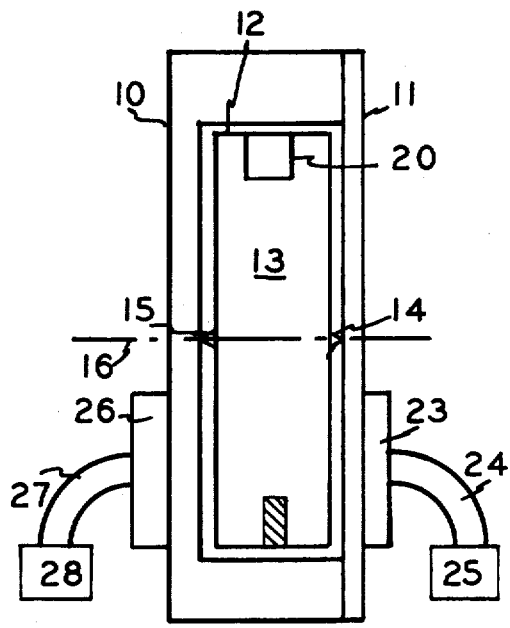
FIG. 2 is a side view of the device through section A—A in FIG. 1.

Referring now to the figures, there is provided a housing 10 having a cover, or closure member 11, affixed thereto and defining with the housing cavity 12. A pendulum member 13 is shown pivotally mounted by pivots 14 and 15, along its longitudinal axis 16, in cavity 12. The cavity is then filled with a liquid which has the specific gravity selected to be equal to the net specific gravity of the pendulum. Pendulum 13 has an air void 20 and a weight 21 mounted substantially along axis 22. A device 23 is shown coupled to the cover 11 and connected by fiber optics 24 to light source 25. Coupled to the back of housing 10 is an optical read-out device 26 connected by the fiber optics 27 to project on a film in camera 28.

Figure 4:
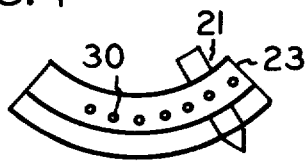
FIG. 4 shows a portion of an optical read-out device utilizing fiber optics.

FIG. 4, showing a series of circular members 30, indicates some of the detail in the optical device 23. It is to be understood that a light beam would be projected through these individual holes 30 to comparable set of holes in device 26 coupled to fibers 27 so that the member 21 effectively blocks out the light passing through one of the holes at a time to indicate on the film the position of the camera with respect to the vertical.

Figure 3:
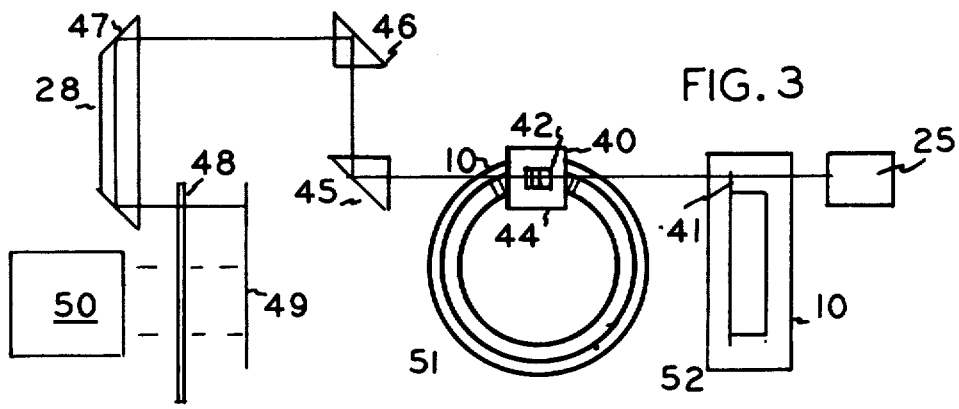
FIG. 3 shows one embodiment of the invention wherein pitch and roll pendulums are provided.

An alternate embodiment of the invention is shown in FIG. 3 wherein the reference reticles 40 and 41 having a plurality of equally spaced lines thereon and a viewing port whereby the light beam from source 25 is reflected through beam splitter 44, prisms 45, 46 and 47 through shutter 48 onto film 49. A lens 50 is shown projecting a picture through shutter 48 onto the film 49 and at the same time the readings from the pitch and roll pendulums 51 and 52 are recorded on the film.

It should be noted that the equations for the operation of this device apply:

$$RM = F_B(r_1 \sin \theta_1) + Fw(r_2 \sin \theta_2)$$
$$f_b = f_w$$
$$F_B = FW$$
$$r_1 = r_2$$

Where
$RM$ = Righting Moment of Pendulum
$f_b$ = Buoyancy Force of Pendulum
$fw$ = Weight of Pendulum
$F_B$ = Buoyance Force of Air Void
$Fw$ = Weight
$r_1 = r_2$ = Distance from Center of Force to Pivot Point
$\theta_1 = \theta_2$ = Angle of Pendulum from Vertical
$G$ = Gravitational Force Obviously many modification and variations of the present invention are possible in the light of the above teachings. It is therefore to be understood that within the scope of the appended claims the invention may be practiced otherwise than as specifically described.

I claim:

1. An improved vertical reference pendulum device, comprising:
   a. a housing;
   b. a cover for sealing said housing and defining therewith a cavity;
   c. a pendulum having mounted therein a weight and an air void mounted in said cavity for rotational motion;
   d. a liquid filling said cavity having a specific gravity substantially equal to the net specific gravity of said pendulum;
   e. opaque indicating means, mounted on said pendulum for indicating the rotational position of said pendulum;
   f. means, for projecting a light beam through said housing, and said pendulum; and
   g. means, for receiving said light beam and projecting it on a film to indicate the position of said pendulum.

2. The device of claim 1 wherein said housing, cover, and pendulum are made of optically transparent material.

3. The device of claim 2 wherein said indicating means include indicia mounted adjacent said pendulum wherein said projected light beam passes through said housing, cover and pendulum and is interrupted by pendulum positions.

4. The device of claim 3 wherein said weight is opaque to light and said projecting light beam.

5. The device of claim 4 wherein there is included a second housing, cover, pendulum, liquid, indicating means, projecting means, and receiving means mounted at substantially 90° with respect to the first housing to measure a second angle from the vertical.

6. The device of claim 1 wherein said pendulum is substantially cylindrical in shape and mounted rotationally about its longitudinal axis about bearing means contacting said housing and said cover.

7. The device of claim 6 wherein said device includes fiber optic members coupling said light beam to said cover means and for coupling said light beam from said housing to said film.

8. The device of claim 7 wherein said fiber optic members are coupled substantially opposite to each other and positioned so that the portions of he rotating pendulum containing said weight is therebetween.

9. An underwater reference device for determining and recording the pitch and roll of a camera directly upon the photographic film, comprising:
 a. first and second pendulums having vertical references axes and mounted in housings for motion substantially 90° in relationship to each other;
 b. indicia on each pendulum to show the relationship of its vertical axis with its individual housing; and
 c. individual lights mounted to project upon said individual pendulums and said housing to illuminate said indicia and pendulums and optical means for projecting said illuminated indicia and pendulums upon the film in a camera.

* * * * *